UNITED STATES PATENT OFFICE.

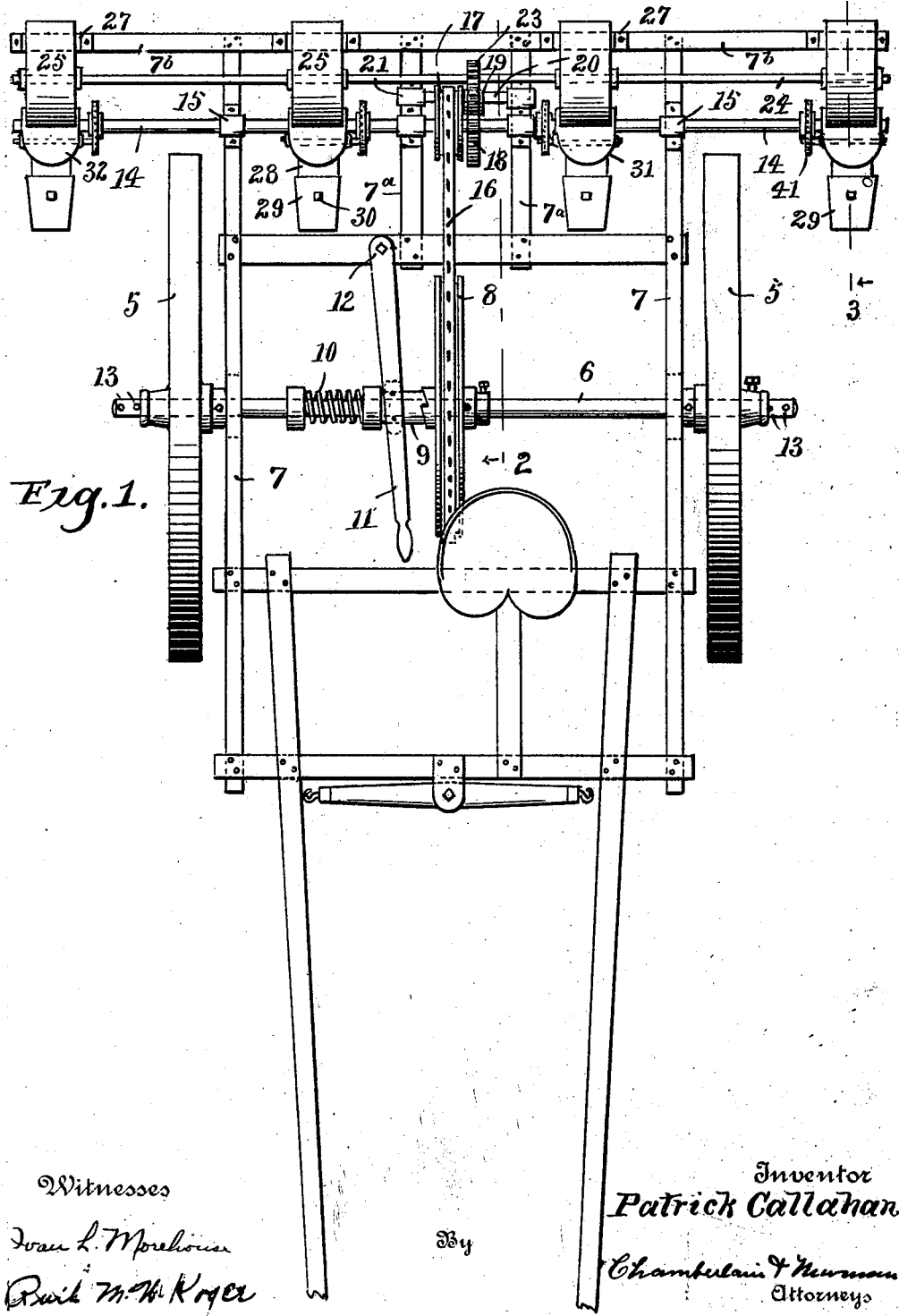

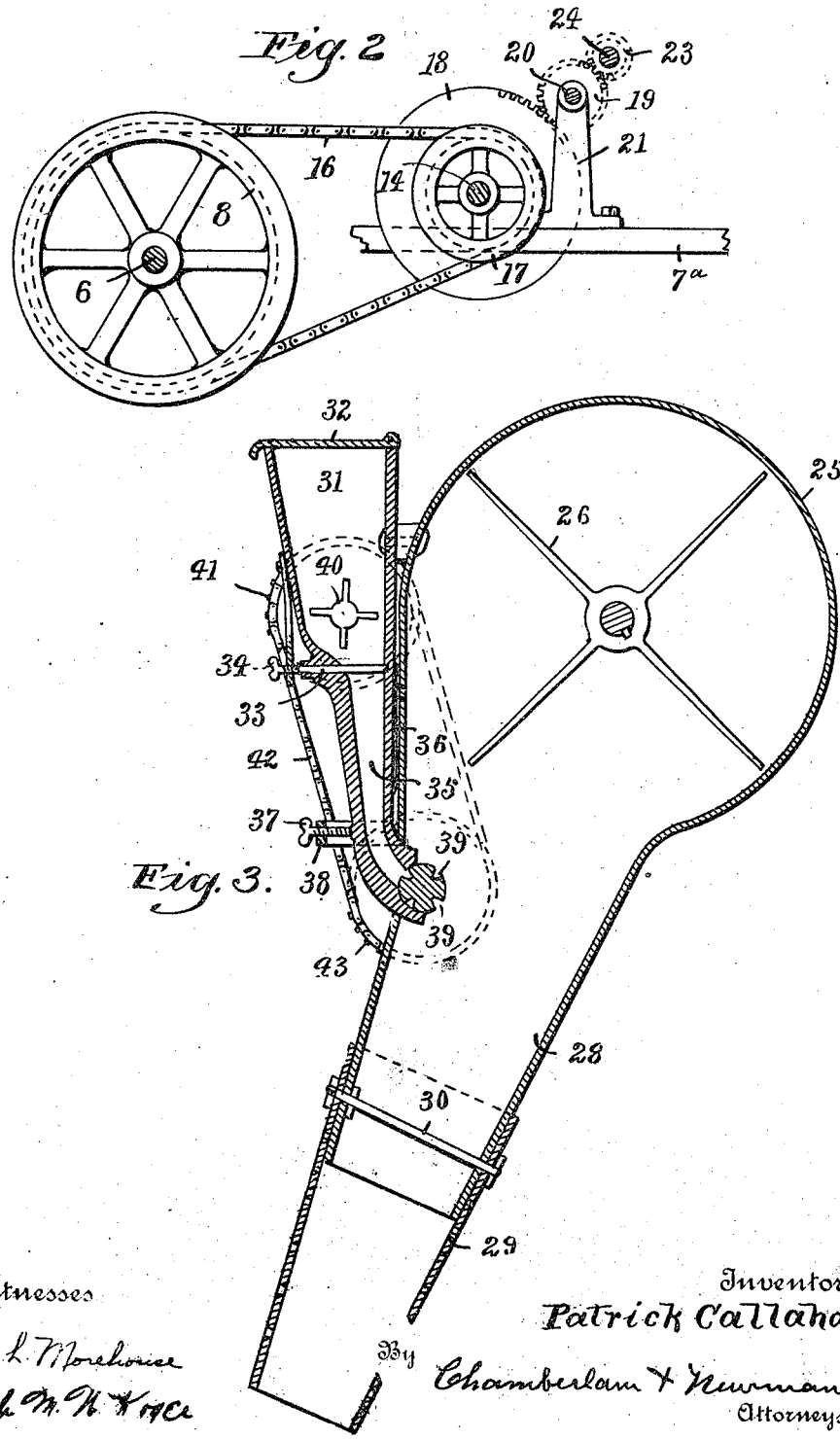

PATRICK CALLAHAN, OF STRATFORD, CONNECTICUT.

MACHINE FOR BLOWING POWDERED POISON ON PLANTS.

1,192,858.      Specification of Letters Patent.      Patented Aug. 1, 1916.

Application filed July 9, 1915. Serial No. 38,895.

*To all whom it may concern:*

Be it known that I, PATRICK CALLAHAN, a citizen of the United States, and resident of Stratford, in the county of Fairfield and State of Connecticut, have invented certain new and useful Improvements in Machines for Blowing Powdered Poison on Plants, of which the following is a specification.

This invention relates to new and useful improvements in devices for blowing dry powdered Paris green or similar dry poisons upon growing vines or bushes, and is especially adapted for use upon potato vines when grown in rows in the usual way.

The object of the invention is to provide a horse drawn machine which is adapted to dust dry poison upon four rows of vines simultaneously and with the traveling of the machine once through the rows; to provide a machine which is simple in construction, effective in its operation and which can be adjusted to regulate the quantity of powdered poison upon the plants; further to provide a positive and mechanically operated device for feeding the powder from the receptacle and finally for distributing and blowing the powder upon the plants in a way to thoroughly dust the same.

With these and other objects in view the invention resides and consists in the construction and novel combination and arrangement of parts hereinafter more fully described, illustrated in the accompanying drawings, and pointed out in the claim hereto apended, it being understood that various changes in the form, proportion, size, and minor details of construction within the scope of the claim may be resorted to without departure from the spirit or sacrificing any of the advantages of the invention.

Similar characters of reference denote like or corresponding parts throughout the several figures of the accompanying drawings forming a part of this specification, and upon which—

Figure 1 shows a plan view of my novel form of machine. Fig. 2 is an enlarged detail sectional elevation taken on line 2 of Fig. 1 and Fig. 3 is an enlarged vertical sectional elevation taken on line 3 of Fig. 1 showing the powder receptacle, agitator, feeding device and blower for distributing the powder upon the plants.

As will be noted the machine is in the form of a two wheel vehicle which is adapted to be drawn by a single horse that travels between the two center rows and further includes four dusting devices properly spaced one from the other to dust four rows of vines at the same time. The machine thus treats two rows of plants on each side of the furrow through which the horse travels, the powder being preferably fed out and blown forward and downward in line with the travel of the vehicle. The several dust feeding devices are connected and driven from the main driving shaft upon which the supporting wheels are mounted.

Referring in detail to the characters of reference marked upon the drawings 5 represents the supporting wheels, 6 the axle upon which one of the wheels is secured and upon which the other is free to turn.

7 represents the frame the longitudinal members of which are provided with bearings to accommodate the axle 6. It will thus be seen that the weight of the machine and the frame as a whole is about equally divided forward and aft of the axle so as to insure its hanging lightly upon the horse.

A sprocket wheel 8 is loosely mounted upon the shaft 6 and is provided with a clutched face hub that is adapted to be engaged by a slidable clutch member 9 which is normally held in engagement with the clutch of the sprocket by means of a spring 10. This slidable clutch member can be thrown out of engagement against the action of the spring at any time through the medium of a lever 11 that engages the slidable clutch member and is pivotally connected to a cross member of the frame as at 12. The axle is provided with several pin holes 13 which makes it possible to set the wheels out farther in order to better accommodate a field of potatoes where the rows are arranged farther apart.

14 represents a longitudinal feed shaft which is supported in bearings 15 secured to the frame and as will be noted (see Fig. 3) extends through the fan casings. This feed shaft is driven from the sprocket wheel 8 through a sprocket chain 16 that engages a suitable sprocket wheel 17 upon the feed shaft 14. A gear 18 is also mounted upon this shaft and serves to drive a pinion 19 mounted upon a short shaft 20 journaled in bearings of the brackets 21 secured to the members 7ᵃ of the frame. This idler in turn operates a pinion 23 secured to the fan shaft 24 which like the feed shaft 14 is disposed crosswise of the machine and extends through the fan casing 25 in which the fans 26 are arranged upon the said shaft in a way to be turned therewith. This line of gear connections obviously serves to drive the fan shaft at a very much higher rate of speed than the feed shaft is driven as is, of course, desirable.

From the foregoing it will be seen that when the clutch 9 is in engagement with the larger sprocket wheel the entire mechanism for dusting the poison powder is operatively connected and upon the other hand when the clutch is disengaged the said feeding devices remain idle leaving the machine free to travel without dusting any of the poison.

The several powder dusting apparatuses are alike in construction and are similarly connected to the two shafts and therefore I will describe but one of these devices and use a single series of reference characters to designate the same parts on each.

The fan casing 25 is supported upon the rear cross member 7ᵇ of the frame by means of brackets 27 and includes a downwardly and forwardly extended chute 28 upon which an extension 29 is pivotally connected. This extension telescopes the end of the chute 28 and is connected thereto by means of a screw bolt 30 so as to allow the lower end of the extension to be slightly deflected to one side or the other, if desired, to accommodate any variation in the distance between the rows of plants and so as to dust the powder centrally over each row. The hopper 31 for containing the powder is secured to the fan casing and includes a chamber that is inclosed by a cover 32. A slidable shut off 33 is located in the bottom of this container and is adapted to be moved in or out by a screw 34 so that the feeding of the powder down into the passageway 35 may be arrested when desired. A spring 36 arranged between the front edge of the casing and the lower end of the container tends to throw the lower end of the container forward against the adjustable screw 37 that is mounted in a bracket 38 and is for the purpose of holding the lower end of the container outlet up against the side of the feed shaft. The adjustment is to permit the device to form either a close or loose working feed with the feed shaft as may be desired to better accommodate all kinds of powder which may be used in the machine. The holes or pockets 39 arranged in the feed shaft serve to convey positive and given quantities of powder from the container down into the fan chute as will be obvious where it is immediately taken by the blast of air and thrown out through the extension.

Within the container 31 is arranged an agitator 40 which is mounted upon a cross shaft journaled in the sides of the container and upon the outer end of this shaft is mounted a small sprocket wheel 41 which is connected by a sprocket chain 42 with a second sprocket 43 mounted upon the feed shaft. This line of connection serves to provide a suitable agitator which turns comparatively slow, and with the feeding of the feed shaft, in a way to keep the powder from packing thus insuring it feeding down freely from the container to the feed shaft.

Having thus described my invention what I claim and desire to secure by Letters Patent is:—

In a poison distributer, the combination with a wheeled frame, of a series of alined casings mounted on said frame, a single fan shaft extending through each of the casings, a fan located in each of the casings and upon said shaft, a poison container having a discharge outlet in the casing, a feed shaft extending through the casings and across the outlets and having pockets therein to feed the poison from the outlet, a spring to normally hold the outlet of the container off from the shaft, and a screw for adjusting the outlet toward the shaft and against the action of the spring.

Signed at Bridgeport in the county of Fairfield and State of Connecticut this 3rd day of July, A. D. 1915.

PATRICK CALLAHAN.

Witnesses:
C. M. NEWMAN,
RUTH M. W. KOGER.